Patented Aug. 2, 1932

1,870,110

UNITED STATES PATENT OFFICE

WILLIAM AUGUSTUS HALL, OF MARIGNANE, FRANCE

PROTECTIVE PAPER FOR AGRICULTURAL OR HORTICULTURAL USES

No Drawing. Application filed February 17, 1931, Serial No. 516,524, and in France February 18, 1930.

This invention relates to cultivation of plants and crops, and has for its object the manufacture of improved protective sheets of paper for mulching plants, these sheets being rain proof but of absorbent nature and rotting easily in the soil. Generally the paper is of porous character and carries impregnating salts of fertilizing nature.

Protective sheets are in use in agriculture and horticulture, and it is known that certain advantages result therefrom. Ordinary paper has been used as a mulch and, while it subserves useful purposes, it readily disintegrates when wet; in fact, a rain storm is apt to ruin paper in place as a mulch. To obviate this disintegrability, there is used paper which has been either impregnated with or coated with asphalt. These papers are expensive and they possess several serious disadvantages. They are not capable of absorbing moisture or allowing the rain to pass through them, and thus they seriously diminish the supply of necessary moisture to the plants underneath. Some danger is also attached to their use, since they are of an inflammable nature. Moreover, since asphalt does not decompose into a manure and prevents the paper from being rotted, it is necessary to gather the sheets up from the ground after their use as protective sheets is completed, that is, after the crop season. Thus it is evident that such protective sheets simply serve to destroy weeds and maintain an even soil temperature, and that their use entails both considerable expense and labor.

One of the objects of my invention is to provide a process of cultivation in which these disadvantages are avoided and in which it is possible to obtain a much enhanced result; not only mulching the soil but introducing fertilizers into the soil. Further objects are to provide improved protective sheets in which the above disadvantages are eliminated and improved means of introducing fertilizing material into the soil.

By the term fertilizer used herein and in the appended claims is meant a substance which is a plant nutrient, as distinct from soil corrective agents such as lime, which have no value as plant foods.

According to the present invention, the protective sheet is made from paper or the like which has been treated in such a manner that it will neither be defibrinated to an extent impairing its use, nor reduced to pulp, by a long exposure to the weather even on damp soil, and yet is capable of absorbing or being impregnated with any desirable substances such as insecticides or fertilizers. Moreover the sheet is porous, so that it will allow liquids to percolate through it, and leach the fertilizing medium progressively into the soil. This presents a more economical means of using fertilizers than the known methods now in use, since there is no danger of the fertilizer being washed or swept away by rain or wind. Moreover the fertilizer is introduced more or less uniformly into the soil near the plants. It has been found that this method of using fertilizer results in a saving of about one-quarter of the amount usually used, principally due to the fact that unnecessary waste due to heavy wind and rain is eliminated. There is, further, no danger of hurting the crop by forming solutions too concentrated in their nature, a very real danger in ordinary ways of putting fertilizer on the soil.

Another feature of the invention is that after the sheets have done their duty as protective coverings i. e. for a period of from four to six months during the season of plant growth it is not necessary to gather them up since it is possible and even preferable to bury them in the soil, where they decompose into humus or manure. The sheets of the present invention do not contain any substance which is not capable of decomposing in the soil, such as asphalt. In the present invention, the protective mulch paper is purposely made free of any body not capable of being attacked by the bacteria of the soil.

The paper is rendered resistant to the weather, but remains permeable to water, and yet when broken up and buried in the soil, it decomposes under the action of bacteriological and chemical forces.

Laminated sheets may be used, the body of the protective paper consisting of one or more sheets of paper which have been saturated with oil. These sheets may carry fertilizing material between them. Such compound sheets present a considerable advantage in that it is possible to incorporate therein much larger quantities of fertilizer, and even introduce into the soil a quantity of fertilizer per unit area which is greater than that which can be introduced by the known methods of applying fertilizers. By ordinary methods of distribution of fertilizers, it is difficult to introduce very much per square foot without danger of local accumulation somewhere that will kill the plants near it. All plant roots are extremely sensitive to saline solutions above a certain rather limited strength.

Another form of mulch paper according to the present invention consists of one or more sheets of porous and absorbent paper coated on one side with wax, which prevents their defibrination, and yet permits the absorption of water or fertilizing solutions. When two sheets of treated paper are joined together, the waxed surfaces are turned towards the outside, and incisions or perforations may be made in the surfacing of the compound sheet to permit water to reach the interior and carry the fertilizer into the soil.

According to one form of the invention, the body of the protective sheet is made of blotting or like absorbent paper. This body is covered on one surface with a waterproofing substance, e. g. wax, wool pitch, rosin or stearin in such a manner that it does not materially penetrate the paper. The sheet is then partially or completely impregnated with a fertilizing solution or a solution of insecticide or both. It is finally dried at such a temperature that the water proofing substance penetrates it from one surface to the other. Decomposable oily materials (oils, fats, or waxes) are used in lieu of stable ones such as paraffin.

By way of example, one such protective paper comprises a sheet of absorbent paper, impregnated nearly or entirely with materials that are fertilizers, or which decompose into them in the soil.

The papers produced at present in accord with this invention, are made up of approximately 30% of fertilizers, which may be nitrates, phosphates and potash, in whatever proportions are selected, according to the plants on which they are used; 40% of an absorbent cellulose paper; 30% of materials, such as waxes and oils that prevent the paper from defibrinating when water soaked, and these materials are preferably of a sort which will decompose or rot, such as wool wax, vegetable waxes and fish or animal oils.

It is to be understood that the invention is in no way limited to the above weight and nature of constituents, which are given merely by way of example.

The waterproofing substance may be applied to the surface of the absorbent paper in any convenient manner e. g. by rubbing it thereon in the solid state, or in any other suitable manner provided that it does not penetrate the paper to such an extent that the power of absorption is seriously diminished.

Protective sheets made in the manner described are able to carry a large quantity of fertilizer.

It is to be understood that the invention is not limited to the use of paper treated as described in the foregoing examples but includes the use of all paper or like material which has been treated in such a manner that it will not be defibrinated or reduced to pulp when exposed to the weather, and yet will remain permeable to liquids, and is capable of becoming rotted when broken up and buried in the soil. The protective sheets may be made or used in the same shape and configuration as any of the protective papers hitherto suggested.

The term "weatherproof" is used in the claims as referring to the weather resistant properties of the material in use above the ground while the term "rottable" is used as indicating that the sheets need not be removed after use since they can be allowed to rot in the soil.

I declare that what I claim is:—

1. A protective paper for agricultural or horticultural use coated on one side with a waterproofing substance and thereby rendered capable of long exposure to moisture when on the soil without being defibrinated to an extent impairing its use and which contains a fertilizer.

2. A protective sheet for agricultural or horticultural use which comprises a paper impregnated with a decomposable oily substance, and containing a fertilizer.

3. A protective paper for agricultural or horticultural use containing a fertilizer coated with wax on the outer surfaces and being thereby rendered capable of long exposure to moisture when on the soil without being defibrinated to an extent impairing its use and yet capable of rotting in the soil.

4. The process of manufacture of a protective paper for agricultural or horticultural use, which consists in coating one surface of a sheet of absorbent paper, with a weatherproofing substance, impregnating said sheet with a fertilizer and insecticide to penetrate said sheet from surface to surface.

5. A mulch paper rendered weatherproof by impregnation with a rottable wax and containing fertilizing material.

6. A mulch paper coated with a rottable wax and a fertilizing material adhering to said wax coating.

7. A mulch paper impregnated with a rottable weatherproofing agent selected from a group consisting of wool pitch, wool wax, vegetable waxes, stearin, fish oils and animal oils.

8. The mulch paper of claim 7 which in addition is impregnated with a fertilizer and an insecticide.

9. A mulch paper weatherproofed to an extent sufficient to prevent defibrination during the growing season, being adapted to rot upon being buried in the soil and carrying fertilizing material.

10. A mulch paper having approximately the composition of 40 per cent absorbent cellulose paper, 30 per cent of decomposable weatherproofing agents and 30 per cent of fertilizer.

11. A mulch paper impregnated with a fertilizer and coated with a rottable weatherproofing agent to the extent that the paper remains permeable to water but will not defibrinate when exposed to the weather.

12. A mulch paper impregnated with a water soluble fertilizer and with a rottable weather proofing agent in such manner that any water which falls upon said paper will gradually percolate through carrying said fertilizer into the soil.

13. A mulch paper comprising a laminated structure of at least two sheets impregnated with a rottable weatherproofing agent and containing fertilizing material between them.

In witness whereof, I have hereunto signed my name this 13th day of January 1931.

WILLIAM AUGUSTUS HALL.